| 106-99 | AU 113 | EX |
| 7/27/82 | XR | 4,341,835 |

United States Patent [19]
MacDowell

[11] 4,341,835
[45] Jul. 27, 1982

[54] MACROFILAMENT-REINFORCED COMPOSITES

[75] Inventor: John F. MacDowell, Painted Post, N.Y.

[73] Assignee: Corning Glass Works, Corning, N.Y.

[21] Appl. No.: 228,195

[22] Filed: Jan. 26, 1981

[51] Int. Cl.$^3$ .............................................. B32B 15/00
[52] U.S. Cl. ...................... 428/292; 428/293; 428/295; 428/392; 428/410; 428/401; 428/701; 428/426; 428/338; 106/99; 65/33; 428/429; 428/412; 428/425.6; 428/417; 428/436; 428/441
[58] Field of Search ............... 428/410, 401, 325, 338, 428/701, 426, 310 HC, 292, 293, 295, 392; 106/99; 65/33

[56] References Cited
U.S. PATENT DOCUMENTS

| 2,779,136 | 1/1957 | Hood et al. | 428/410 |
| 3,788,935 | 1/1974 | Shyne et al. | 428/401 |
| 3,987,600 | 10/1976 | Baehr | 428/310 HC |
| 4,059,454 | 11/1977 | Reade | 428/410 |

*Primary Examiner*—P. Ives
*Attorney, Agent, or Firm*—Kees van der Sterre

[57] ABSTRACT

Composite materials consisting of a matrix incorporating high-aspect-ratio reinforcement members, wherein the reinforcement members consist of relatively large, prestressed glass or glass-ceramic members, such as macrofilaments or rods having diameters in excess of about 0.010 inches, are described.

6 Claims, 1 Drawing Figure

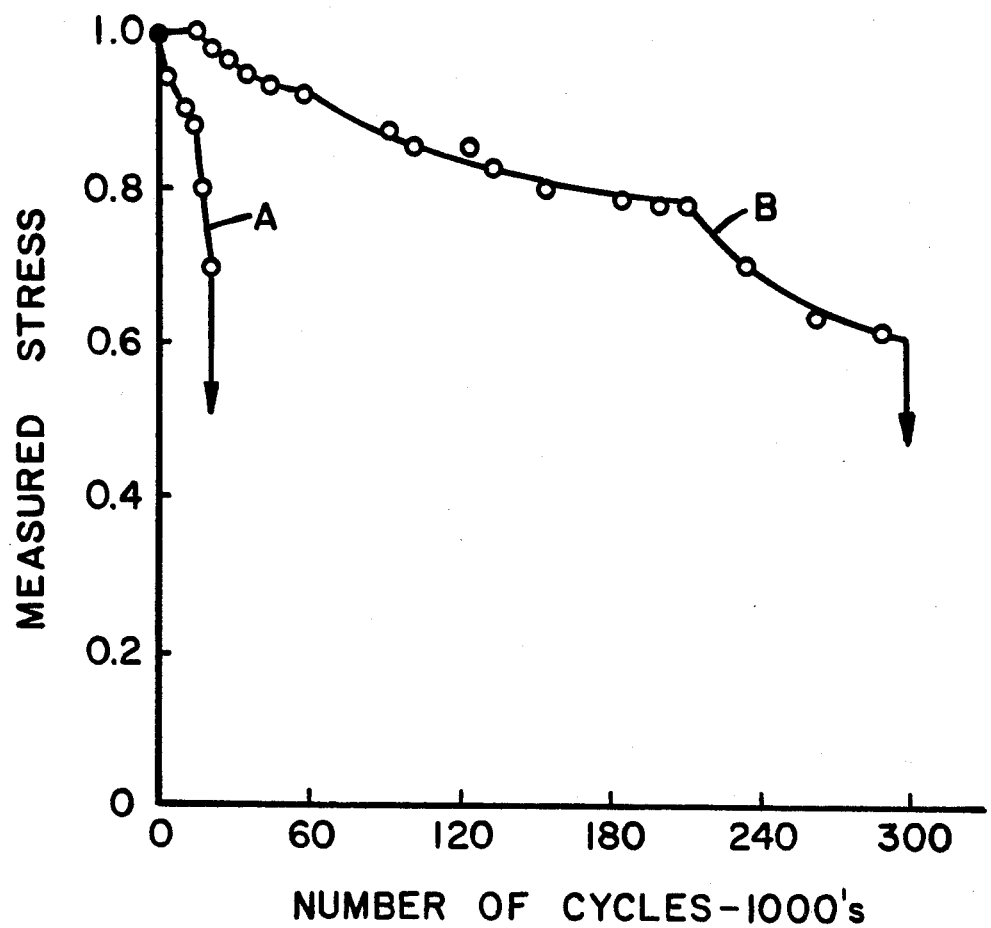

MACROFILAMENT-REINFORCED COMPOSITES

BACKGROUND OF THE INVENTION

The present invention relates generally to reinforced bodies known as fiber-reinforced composites and particularly to composites comprising a matrix material strengthened by prestressed glass or glass-ceramic macrofilaments.

The use of strong filamentary reinforcement materials to improve the strength-to-density ratios of organic and inorganic matrix materials is well known. Reinforced products of this type, referred to in the art as "fiber-reinforced composites", typically comprise a plastic, metallic or ceramic matrix material into which has been incorporated a multiplicity of metallic or ceramic, amorphous, polycrystalline or single-crystal reinforcing fibers or filaments. One common example of such a product is a reinforced plastic composite comprising a cured thermosetting plastic resin matrix containing a substantially volume proportion of glass or ceramic fibers as a reinforcing phase.

Where glass and ceramic filaments have been used as a reinforcing phase in such composites the filament diameters have tended to remain small, typically in the range of 1–50 microns. In the "Glass Engineering Handbook", E. B. Shand, pages 431–432, Second edition (McGraw-Hill, New York 1958), J. A. Grant has noted that fibrous glass reinforcement conventionally consists of filaments of 0.00023–0.00075 inches (~5–20 microns) diameter, preferably 0.00040–0.00060 inches (~10–15 microns) diameter. U.S. Pat. No. 3,788,935, a patent suggesting the use of a combination of large and small filaments to reinforce plastics, utilizes small interstitial fibers of 1–3 microns diameter and large filaments of 10–100 microns diameter. U.S. Pat. No. 4,140,533 suggests the use of alkali-resistant glass fibers 5–50 microns in diameter as a reinforcing medium for cement products.

U.S. Pat. No. 3,732,180 discloses the use of soft glass flakes, particles or sheets of much larger dimension for reinforcement purposes. The glass used is quite soft, and can be worked into fibers after mixing with the plastic by extruding or otherwise shaping the glass-plastic mass. Again, however, the resulting fibers are of small diameter, e.g., in the range of about 0.1–100 microns.

Recent advances in the field of glass fiber-reinforced composites have involved not only improved techniques for the production of strong, defect-free composites but also methods for evaluating such composites in a manner yielding improved strength and fatigue performance data. In a recent Ph.D. thesis entitled "Fatigue Performance Characteristics and Fatigue Life Limitations of Fiber Glass Composites", (August 1978, Case Western Reserve University), at pages 77–82, H. C. Kim has offered some important conclusions relating to the nature of the life-limiting mechanisms of such composites under prolonged cyclic loading conditions. One important finding was that, in properly prepared, well-bonded composites, the strength and surface integrity of the fibers were dominating factors in composite failure due to fatigue under certain modes of stress. Specifically, under cyclic flexural stress or other tension exerted axially with respect to the reinforcing fibers, fiber failure was found to be the first observed event leading to composite failure.

SUMMARY OF THE INVENTION

The present invention stems largely from a recognition of the fact that glass fiber failure normally results from surface flaws on the fibers which are unavoidably generated thereon either in the course of handling prior to composite fabrication or via chemical attack or mechanical abrasion during the useful life of the composite. The normally higher average strengths of small diameter glass fibers, which has favored their use in fiber-reinforced composites, is thought to result from a lower surface area per fiber when compared with larger glass filaments, rods or other members having more exposed surface. Thus small glass fibers can exhibit unabraded modulus of rupture strengths averaging well over 100,000 psi as made, a value substantially higher than that of conventionally made, larger diameter glass rod or cane. Unfortunately, however, surface flaw generation in glass fibers can drastically reduce these modulus of rupture strengths to values less than 10,000 psi, correspondingly reducing the strength of composites incorporating fiberglass and limiting the field of applications for such composites.

The present invention employs glass reinforcement in the form of prestressed glass or glass-ceramic macrofilaments (large diameter filaments), glass rods, or other high-aspect ratio glass members to provide reinforced composites with plastic or such other matrix materials as cements, wollastonite, gypsum or the like. The glass or glass-ceramic reinforcement members are prestressed in that they are provided with high surface compressive stresses, such that they exhibit modulus of rupture strengths of 100,000 psi or more even in a surface-abraded state. The basic idea underlying the invention is that high surface compression will allow mechanically or chemically generated flaws to exist on the surfaces of the reinforcement members without propagating through the compression layers.

The advantages attending the use of prestressed glass macrofilaments or rods as reinforcing media in known matrix materials are several. First, loss of strength in the reinforcing elements through handling and abrasion is avoided because of the presence of the compressive surface layer, substantially extending the life of the composite. Secondly, the surface compression layer on the element can be made sufficiently thick to provide complete protection of the inner tension zone (core) of the member from chemical interactions with the matrix, a factor which can be critical in applications such as cement reinforcement where reactions with the matrix can be expected.

Of course, the use of relatively large reinforcing members also avoids some of the fabrication problems encountered in the manufacture of composites from fiberglass, especially facilitating the construction of products wherein the reinforcing phase is preferentially oriented or aligned. This makes possible the fabrication of relatively massive, load-bearing composite structures such as beams, cables or columns which could not practically be made with conventional fiberglass reinforcement.

Finally, the use of relatively large glass-reinforcement members is expected to offer significant economic advantages. Loading a composite matrix with a single 25-mil macrofilament is the cross-sectional equivalent of using 6000 conventional eight-micron reinforcing filaments, and the larger filament size should be more economical to produce on a pound-for-pound basis.

While the glass or glass-ceramic reinforcement elements employed in accordance with the invention are typically provided as prestressed rods or macrofilaments (filaments having a diameter of 0.010 inches or more), other prestressed members such as flat cane, ribbon, or even tubular (hollow) members could alternatively be employed. To be suitable for the production of reinforced composites it is necessary only that the prestressed members have a relatively high aspect ratio and an abraded modulus of rupture strength of at least about 100,000 psi. Typically, the prestressed reinforcement members will have a thickness in the smallest dimension (minimum thickness) of between 0.010 and 1.00 inches and will have an aspect ratio or length-to-minimum-thickness ratio of at least 10:1, preferably at least 100:1.

BRIEF DESCRIPTION OF THE FIGURE

The drawing consists of a diagram in the form of a graph plotting the effect of repeated bending on the stiffness of composite glass-plastic articles provided in accordance with the invention and with the prior art.

DETAILED DESCRIPTION

The composition of the glass or glass-ceramic material to be utilized in fabricating prestressed reinforcing members for reinforced composites is normally not a factor affecting its suitability for such use, except perhaps in cases where chemically hostile matrix materials such as alkaline cement and concrete formulations are to be reinforced. However composition is a factor to be considered in determining the technique to be employed in prestressing the glass or glass-ceramic members prior to their incorporation into the composite article.

A number of different techniques for imparting high compressive surface stress to glass and glass-ceramic materials are known in the ceramic arts. Among these are included ion-exchange or so-called chemical tempering, thermal tempering as by rapid cooling, lamination or the application of a discrete surface layer of glass to a supporting glass member of differing composition, and differential crystallization which involves the development of a semicrystalline surface layer on a glass or glass-ceramic member by a controlled heat treatment.

The technique of chemical tempering involves the development of compressive stress in a glass or glass-ceramic member either by ionic stuffing or by surface ion-exchange reactions causing composition changes which result directly in high surface compression or provide thermally induced surface compression as the member is cooled following the tempering treatment. In the stuffing method, discussed for example in U.S. Pat. Nos. 3,790,340 and 4,074,992, the replacement of a relatively small ion in the structure of the glass or glass-ceramic surface with a much larger ion, utilizing an ion exchange reaction at temperatures sufficiently low so that the glass or glass-ceramic surface cannot flow to relieve the stress caused by the introduction of the larger ion, can develop very large compressive stresses in the surface of the treated article.

In chemical tempering by surface composition changes the objective of the ion exchange reaction is to change the composition of the surface layer of the article so that it will develop compressive stress either directly or with subsequent processing, e.g., by crystallization and/or by cooling. U.S. Pat. Nos. 2,779,136 and 3,573,072 discuss strengthening mechanisms of this type.

The use of a lamination technique to produce strengthened glasses or glass-ceramics having compressive surface stresses is also known. U.S. Pat. No. 2,313,296 describes the production of laminated glass fibers strengthened by a thermal expansion mismatch between the core and the glass surface layer, while Canadian Pat. No. 846,721 discloses fibers wherein strengthening results from core shrinkage due to core crystallization.

While any of the known strengthening methods involving the development of surface compression could theoretically be used to provide prestressed glass or glass-ceramic reinforcement members, the preferred strengthening methods are ion-exchange techniques of the direct-stress-producing type. These are exemplified for glasses by U.S. Pat. No. 3,790,430 and for glass-ceramics by U.S. Pat. No. 3,573,072. As noted in the former patent and related patents in the art of glass tempering, best results in terms of strength retention among glasses are obtained with alkali aluminosilicate glasses comprising 5–25% of alkali metal oxides selected from the group consisting of $Li_2O$, $K_2O$ and $Na_2O$, 5–35% $Al_2O_3$, and 80% total of alkali metal oxides + $Al_2O_3$ + $SiO_2$ by weight. The latter patent, on the other hand, illustrates the very high strengths exhibited by nepheline glass-ceramics which have been ion-exchange-treated to provide compressive kalsilite surface layers.

Since the above types of strengthening are accomplished at temperatures below those at which stress release can occur in the surface of the glass or glass-ceramic member being treated, very high surface compressive stresses can be directly generated in the member during the ion-exchange step. Such techniques can readily provide glass macrofilament or rod with abraded modulus of rupture strengths above 100,000 psi and glass-ceramic macrofilament or rod with modulus of rupture strengths above 200,000 psi.

In addition to producing reliably strong macrofilament or rod reinforcement, the above described strengthening methods have the potential of producing harder surfaces on the reinforcement members which are expected to be substantially more resistant to flaw formation due to abrasion or corrosion than untreated surfaces. Thus it is anticipated that the virgin strength of the prestressed reinforcement can be substantially maintained through the process of incorporation into the composite structure.

The following examples describe in greater detail the production of prestressed reinforcement members suitable for use in accordance with the invention.

EXAMPLE I

A molten glass having a composition, in parts by weight as calculated from the batch, of about 61.2 parts $SiO_2$, 17.0 parts $Al_2O_3$, 12.94 parts $Na_2O$, 3.43 parts $K_2O$, 3.48 parts MgO, 0.39 parts CaO, 0.78 parts $TiO_2$ and 0.75 parts $As_2O_3$ is prepared from which filaments are to be drawn. This glass is formed into macrofilaments having diameters of 0.015, 0.025, 0.035 and 0.050 inches by down-drawing from a container of the molten glass. The macrofilaments thus provided are broken into 12-inch lengths, fully annealed at 600° C., and then prestressed by subjecting the lengths to an ion-exchange strengthening process to develop surface compression layers thereon.

The ion-exchange treatment employed is one involving a K+-for-Na+ ion exchange at a temperature below the strain point of the glass. The strain point temperature of this particular glass is about 579° C., and the ion-exchange treatment is carried out in a molten salt bath consisting essentially of molten KNO3 at temperatures and for times depending upon the macrofilament diameter as follows:

TABLE I

| Macrofilament Diameter (inches) | Treatment Time (hrs.) | Treatment Temperature (°C.) |
|---|---|---|
| 0.050 | 1.5 | 500° |
| 0.035 | 1.0 | 475° |
| 0.025 | 2.0 | 450° |
| 0.015 | 0.08 | 450° |

The ion-exchanged macrofilaments thus provided are tumble-abraded with silicon carbide to assure uniform surface abrasion, with some of the macrofilaments being first examined to determine the depth of the ion-exchanged surface compression layers thereon, and the macrofilaments are then tested to determine the strengths imparted thereto by the ion-exchange treatment. The depth-of-compression values are taken to be equivalent to the depth of K+ ion penetration into the macrofilament surface as determined by an electron microprobe examination.

Determining the modulus of rupture strengths of macrofilaments of small diameter is complicated by the high flexibility thereof. For the purpose of the present description the modulus of rupture strength of a macrofilament or other prestressed reinforcement member is that stress at which the member fails in bending. For relatively thick macrofilaments and heavier members this can be computed directly from the bending force necessary to cause breakage, which is typically determined in a conventional three-point bending test. With the exception of the 0.015-inch macrofilaments in Table I, the modulus of rupture strengths of the reported macrofilaments were determined by three-point bending over a 0.375-inch knife edge span.

For very thin macrofilaments the modulus of rupture strength can alternatively be computed from the deformation (strain) necessary to cause breakage in bending, given the elastic modulus of the glass as determined on bulk samples. A filament of thickness t is slowly bent to the breaking point, the diameter of curvature D at breakage is noted, and the breaking stress $\sigma$ is calculated from the elastic modulus E using the relationship $\sigma = Et/D$. This method was used to calculate the modulus of rupture strength of the prestressed 0.015-inch macrofilament of Table I.

An investigation of the properties of the macrofilaments described in Table I yielded the data reported in Table II below. That data includes an indication of the filament diameter in inches, calculated values of modulus of rupture strength (M.O.R.) in pounds per square inch, and measured depths of compression layer (D.O.L.) in inches. In one case the filaments were also tensile-tested for strength over a nine-inch gauge length; the average tensile strength value (T.S.) for those filaments, in pounds per square inch, is also reported.

TABLE II

| Diameter (inches) | M.O.R. (psi) | D.O.L. (inches) | T.S. (psi) |
|---|---|---|---|
| 0.050 | 134,000 | 0.0024 | — |
| 0.025 | 176,000 | 0.0017 | — |
| 0.025 | 167,000 | 0.0021 | 98,000 |
| 0.015 | 152,000 | — | — |

The above data show the retention of substantial modulus of rupture strengths following abrasion, suggesting that prestressed macrofilaments produced as described would exhibit good resistance to strength degradation in handling during incorporation into a composite structure.

EXAMPLE II

A molten glass having a composition, in parts by weight as calculated from the batch, of about 46.7 parts $SiO_2$, 34.0 parts $Al_2O_3$, 15.9 parts $Na_2O$, 3.4 parts $K_2O$, 8.0 parts $TiO_2$, and 0.8 parts $As_2O_3$ is drawn from a crucible into glass cane about ¼ inches in diameter. Four-inch lengths of this cane are subjected to a heat treatment to convert them to glass-ceramics. This treatment comprises heating at a rate of 300° C./hr. to 850° C., holding at 850° C. for 4 hours, heating at a rate of 300° C./hr. to 1100° C., holding at 1100° C. for 4 hours, and finally cooling the sections at furnace rate to ambient temperatures. Examination of the glass-ceramic cane resulting from such a treatment using X-ray diffraction techniques normally indicates the principal crystal phase present therein to be a nepheline solid solution of the approximate composition $Na_7KAl_8Si_8O_{32}$.

Five sections of glass-ceramic cane produced as described are subjected to an ion-exchange strengthening treatment wherein the cane sections are immersed in a molten salt bath consisting of about 52% KCl and 48% $K_2SO_4$ by weight at a temperature of 730° C. After an immersion interval of 8 hours, the sections of cane are removed and cleaned. Examination of the product shows the presence of a compressively stressed kalsilite surface layer on the strengthened cane. The cane is then tumble-abraded with silicon carbide to cause uniform surface abrasion simulating surface abuse and finally tested for modulus of rupture strength. The average modulus of rupture strength of the samples as measured by 3-point bending is 203,100 psi, even though the samples have experienced severe surface abrasion from the silicon carbide.

While prestressed glass-ceramic reinforcement members such as produced in accordance with this Example constitute the preferred reinforcement from the standpoint of strength, it will be recognized that other considerations relating to the intended use of the reinforcement may favor the use of other materials. Thus the foregoing Examples are merely illustrative of prestressed reinforcing members which could be provided and used in accordance with the invention.

The use of prestressed reinforcement members such as described is not limited to a particular matrix material or class of materials, but rather extends to any of the known materials with which fiber glass reinforcement has been utilized in the prior art. Among the matrix materials which have been proposed for composite fabrication in the prior art, and which also could be used to provide composites in accordance with the invention, are cement, concrete, gypsum, plastic, rubber, metal and even glass. Examples of plastics which could be used include thermosetting polyester, epoxy, phenolic, melamine and silicone resins, thermoplastic formulations based on polyethylene, polycarbonate, polyurethane or the like, and elastomers such as silicone rubber or the like.

In general the use of bonding agents to secure good adherence between prestressed glass or glass-ceramic reinforcement members and the surrounding matrix is necessary where plastic matrix materials are employed. The lower total surface area and higher strength provided by prestressed macrofilament, rod or other relatively large cross-section reinforcement increases the importance of good glass-plastic bonding in the composite. Presently available bonding agents for glass-plastic composites which could be used include any of the known silane, chrome or other coupling agents previously used to treat fiberglass prior to incorporation into a plastic matrix material.

Composite fabrication techniques which could be used to prepare a prestressed macrofilament-reinforced plastic article in accordance with the invention are more fully illustrated in the following examples.

EXAMPLE III

A number of prestressed glass macrofilaments 0.025 inches in diameter, prepared in accordance with the procedure described in Example I above, are thoroughly cleaned by sequential treatment with a degreasing solvent, chromic acid, and deionized water. They are then provided with a coating of a coupling agent by immersion in a 1% solution of a commercially available coupling agent, Union Carbide A-174 silane coupling agent, followed by drying.

The coated macrofilaments are arranged in a spaced array in a molding cavity of 0.50"×0.30"×15" inside dimensions, metal or plastic spacers being attached to the ends of the filaments to assure proper spacing. The molding cavity is then closed and partially evacuated, and a thermosetting plastic resin is admitted to the chamber while the partial vacuum is maintained. The resin employed is a high temperature polyester resin, Derakane ® 470-45 resin, commercially available from the Dow Chemical Co., Midland Mich., to which 1.5% of a benzoyl peroxide catalyst and 6% of a styrene monomer have been added.

After the molding chamber has been filled with resin and air bubbles evacuated therefrom, the chamber is pressurized to about 60 psi for one hour and then water-bath-heated to 185° F. (85° C.) for an additional hour, while still under pressure, to cure the resin. After curing, the mold and composite are cooled to ambient temperature and the mold is opened to permit removal of the cast composite. Examination of the cast product, including a microscopic examination of cross-sectional samples thereof, indicates that the composite bar is substantially free of major defects such as voids, cracks and macrofilament misalignment with good distribution of the macrofilaments throughout the volume of the sample.

Cast composite bars produced in the manner above described, containing 0.025-inch prestressed macrofilament reinforcement in volume fractions of 37 and 60 volume percent, are tested for physical properties using both conventional static bend testing procedures and the newer reversed bending fatigue testing method reported in the above-noted Kim thesis "Fatigue Performance Characteristics and Fatigue Life Limitations of Fiberglass Composites", Case Western Reserve University (August 1978). In the static bend tests, conducted with a three-point or a four-point bending fixture in conventional fashion, composite samples incorporating 37 volume percent of the prestressed macrofilaments typically fail in bending at an average stress of 40,350 psi, while samples incorporating 60 volume percent of the macrofilaments fail at about 56,300 psi.

Given these ultimate flexural strength values, cyclic fatigue testing is undertaken under completely reversed loading conditions at initial stress levels below those causing immediate bending failure, as described in the above-noted Kim thesis. Such testing involves repeated, completely reversed flexing of composite samples 10½ inches in length and 0.275×0.5 inches in cross-section in a standard four-point Sonntag bending fixture with a 5-5/16-inch lever arm length, a 14¼ inch support span length and a 3⅜ inch load span length.

Bending is carried out under fixed deflection conditions, the deflection distance being fixed at a value which generates a stress in each fresh sample equivalent to a known fraction of the maximum flexural strength ($\sigma$max.) of that sample. Repeated, fully reversed bending of the sample to this fixed deflection limit is then commenced at frequencies of up to 2 cycles per second while the resulting stress levels are monitored to determine the extent of damage to the composite matrix. In general, the stress at fixed deflection is reduced over time in proportion to the amount of fatigue damage sustained by the sample. Flexing is continued until the sample fails or until the test is terminated.

The results of such testing indicate that the described composites incorporating prestressed macrofilament reinforcement, while not quite as strong as equivalently loaded fiberglass composites, exhibit significantly higher resistance to fatigue damage than do conventionally reinforced composite materials. Table III below reports results for such a program of fatigue testing and compares the results with similarly generated fatigue data for fiberglass-reinforced composites. Included in Table III are an indication of the reinforcement used, whether conventional fiberglass (fiber size 10–19 microns) or prestressed macrofilament; the volume fraction of reinforcement employed, as a percent; the stress level used for the test, expressed as a fraction of the maximum projected flexural strength of the sample configuration under test; the flexing frequency in cycles per second; and the number of cycles to sample failure, or to test interruption if no sample failure occurred.

TABLE III

| Reinforcement Type | fiberglass | fiberglass | macrofilament (0.035") | macrofilament (0.025") | macrofilament (0.025") |
|---|---|---|---|---|---|
| Volume Fraction Reinforcement | 59% | 57% | 60% | 60% | 60% |
| Test Stress Level (Fraction $\sigma$ max.) | 0.34 | 0.34 | 0.33 | 0.33 | 0.50 |
| Flexing Frequency | 1/sec | 1/sec | 2/sec | 2/sec | 2/sec |
| Cycles to Failure | 4,700 | 22,000 | 300,000 | no failure | no failure |

| Reinforcement Type | fiberglass | fiberglass | macrofilament (0.035") | macrofilament (0.025") | macrofilament (0.025") |
|---|---|---|---|---|---|
| | | | | at 1,000,000 | at 900,000 |

The above data evidence the significantly higher fatigue resistance of prestressed macrofilament-reinforced composites when compared with fiberglass-reinforced composites stressed to equivalent fractional load levels.

A further understanding of the fatigue behavior of composite glass-plastic structures subjected to cyclic loading in the manner described can be derived from a study of the appended drawing, which diagrammatically illustrates the phenomenon of stress or stiffness decay occurring as a function of cycle time for a fixed deflection, reversed bending fatigue test such as above described. The vertical axis of the diagram reports the measured stress level as a ratio of the measured stress to the stress initially applied to the sample at the start of the test, while the horizontal axis measures test duration in terms of the number of test cycles applied to the sample. The data reported are for the 57% (volume) fiberglass reinforced sample of Table III (Curve A) and for the similarly loaded 0.035" macrofilament-reinforced sample of Table III (Curve B). The much more rapid decay in stiffness of the fiberglass-reinforced sample when compared with the prestressed macrofilament-reinforced sample is evident from the reported data.

In an effort to determine the effects, on macrofilament strength, of filament handling prior to and during composite fabrication, prestressed macrofilaments prepared in accordance with Example I and incorporated into a polyester matrix in accordance with Example III are leached out of the composite matrix and tested for strength. The strength tests are conducted in uniaxial tension, rather than by three-point bending, and are conducted on both as-made and leached-out prestressed filament samples of 0.025-inch diameter and nine-inch gauge length. The breaking stress for the macrofilaments as made averages 98,000 psi, while that of the composited, leached-out filaments is 93,000 psi. This represents a strength loss which could be deemed quite moderate in view of the large strength losses which have been known to result from the handling of conventional fiberglass.

EXAMPLE IV

Glass-ceramic macrofilaments are made in accordance with a procedure similar to that described for the production of glass-ceramic cane in Example II. The filaments are 0.050 inches in diameter and 2 inches in length, and are strengthened by a potassium-for-sodium ion-exchange tempering treatment to an abraded modulus of rupture strength in excess of 200,000 psi. The surface compression layer imparting this strength is a kalsilite layer having an estimated thickness in the range of 0.004–0.005 inches.

To test the survivability of these prestressed macrofilaments in a concrete mixing environment, 1 volume percent of the macrofilaments are added to a premixed 1.22 cubic foot batch of Portland cement-based concrete. That batch comprises water, cement, gravel and sand in proportions of about 750 lb/yd$^3$ of Portland cement, 1231 lb/yd$^3$ of sand, 1729 lb/yd$^3$ of coarse limestone aggregate, and 325 lb/yd$^3$ of water. The batch also contains a small amount of a setting retardant.

The batch with macrofilaments is mixed in a rotary drum mixer until homogeneous dispersion of the macrofilaments is achieved, a sample is extracted for examination, and mixing is continued for an additional thirty minutes with samples being extracted every ten minutes for further examination. The extracted samples are sieved to reclaim the macrofilaments and the latter are then examined and counted to compute the quantity of reinforcement remaining in each sample. It is assumed that the amount of recovered macrofilament will decrease below the initial value of 1% (volume) with mixing time if substantial filament breakage occurs. In the present case, however, as shown by the data in Table III below, no significant filament breakage is observed.

TABLE III

| Mixed Sample | Initial Mix | 10 min. Mix | 20 min. Mix | 30 min. |
|---|---|---|---|---|
| Volume Percent Reversed Filament | 0.86% | 0.89% | 0.85% | 0.99% |

A microscopic examination of the condition of the recovered filaments indicates that the prestressed surfaces have not sustained significant damage during mixing, and establishes that only about 2% of the recovered fibers have lengths significantly below the two inch lengths of the starting filaments. These results indicate that the durability of the prestressed glass-ceramic macrofilament reinforcement is sufficient for a concrete mixing environment.

Flexural strength test samples about 2.5×4.5×9.0 inches in size, formed from the described macrofilament-containing concrete batch as first mixed, are tested in accordance with test procedure ASTM C293 to determine the behavior of the macrofilaments under stress. As expected, the glass-ceramic macrofilament does not impart strengthening to the sample at this low reinforcement level. However, the macrofilament does provide support to the specimen even after failure of the concrete matrix has occurred. The prestressed macrofilaments exhibit the relatively desirable failure mode of pulling out of the concrete matrix, rather than catastrophically failing when excessive tensile stress is encountered. Moreover, flexural test samples prepared in a similar way, but at a loading of 12 volume percent of prestressed macrofilaments, do show a substantial strengthening effect in this concrete matrix.

EXAMPLE V

The prestressed glass-ceramic macrofilaments described in Example IV are incorporated at a loading of 2.0 volume percent into a batch based on a refractory calcium aluminate cement. The batch is cast into 2.5×4.5×9.0 refractory brick specimens which are cured and dried at 230° F.

Refractory brick specimens prepared as described exhibit slightly higher flexural strengths than non-reinforced bricks, although some cracking of the reinforced bricks following heating is observed. This effect is attributed to the relatively large diameter of the particular macrofilament reinforcement used. More importantly, however, the macrofilament-reinforced samples exhibit slow or "ductile" flexural failure under breaking stress even after firing to 2000° F., a behavior not expected with steel reinforcing fibers. This slow failure is again attributable to macrofilament "pull-out" from the supporting matrix after stress failure of the matrix material has occurred.

Of course it will be recognized that the foregoing examples are merely illustrative of prestressed reinforcing elements and composite materials which could be provided in accordance with the invention as herein described. It is contemplated that many modifications of these illustrative products and methods could be undertaken within the scope of the invention as set forth in the appended claims.

I claim:

1. A composite article comprising a matrix phase and a high-aspect-ratio reinforcing phase, wherein the high-aspect-ratio reinforcing phase consists of multiple elongated, prestressed glass or glass-ceramic members having a minimum thickness in the range of about 0.010–1.00 inches, a minimum length:thickness ratio of at least about 10:1, and compressively stressed surface layers imparting to each of said members an abraded flexural modulus of rupture strength of at least 100,000 psi.

2. A composite article in accordance with claim 1 wherein the prestressed glass or glass-ceramic members are glass or glass-ceramic macrofilaments or rods having a diameter in the range of 0.010–0.100 inches.

3. A composite article in accordance with claim 2 wherein the prestressed members are composed of an alkali aluminosilicate glass comprising 5–25% of an alkali metal oxide selected from the group consisting of $Li_2O$, $Na_2O$ and $K_2O$, 5–35% of $Al_2O_3$, and at least 80% total of alkali metal oxides + $Al_2O_3$ + $SiO_2$ by weight, and incorporate compressive surface layers wherein relatively large alkali metal ions have been substituted for relatively small alkali metal ions.

4. A composite article in accordance with claim 2 wherein the prestressed members are composed of a nepheline glass-ceramic and incorporate compressive kalsilite surface layers.

5. A composite article in accordance with claim 2 wherein the matrix phase is composed of plastic.

6. A composite article in accordance with claim 2 wherein the matrix phase comprises a cement.

* * * * *